(12) United States Patent
Battaglia

(10) Patent No.: US 6,866,878 B1
(45) Date of Patent: Mar. 15, 2005

(54) METHOD AND APPARATUS FOR PRODUCING CO-EXTRUDING PASTA

(76) Inventor: John M. Battaglia, 78 McKinley St., Hackensack, NJ (US) 07601

( * ) Notice: Subject to any disclaimer, the term of this patent is extended or adjusted under 35 U.S.C. 154(b) by 376 days.

(21) Appl. No.: 10/063,755

(22) Filed: May 10, 2002

(51) Int. Cl.[7] .............................. A21C 9/06; A23P 1/00
(52) U.S. Cl. ......................... 426/516; 99/353; 99/355; 99/357; 99/450.6; 99/450.7; 99/484; 426/275; 426/283; 426/557
(58) Field of Search ............................... 426/512, 516, 426/275, 283, 557; 99/353, 355, 357, 450.6, 450.7, 484; 425/133.1, 308, 377

(56) References Cited

U.S. PATENT DOCUMENTS 5,693,351 A * 12/1997 Cuperus ..................... 426/94
6,312,749 B1 * 11/2001 Annicchiarico ............. 426/516

* cited by examiner

Primary Examiner—George C. Yeung
(74) Attorney, Agent, or Firm—Richard A. Joel, Esq.

(57) ABSTRACT

A method and apparatus for producing co-extruded pasta such as stuffed rigatoni and for providing the ability to make a plurality of end crimps with a single die. The method involves distributing pasta dough from an extruder to multiple co-extrusion die inserts that are arranged in a straight line. The straight-line design allows the co-extruded dough strands to drop directly into a single crimp/cut die that has a selected straight, angular or other cut. The invention may be adapted and utilized on any new or pre-existing pasta dough extruders.

12 Claims, 2 Drawing Sheets

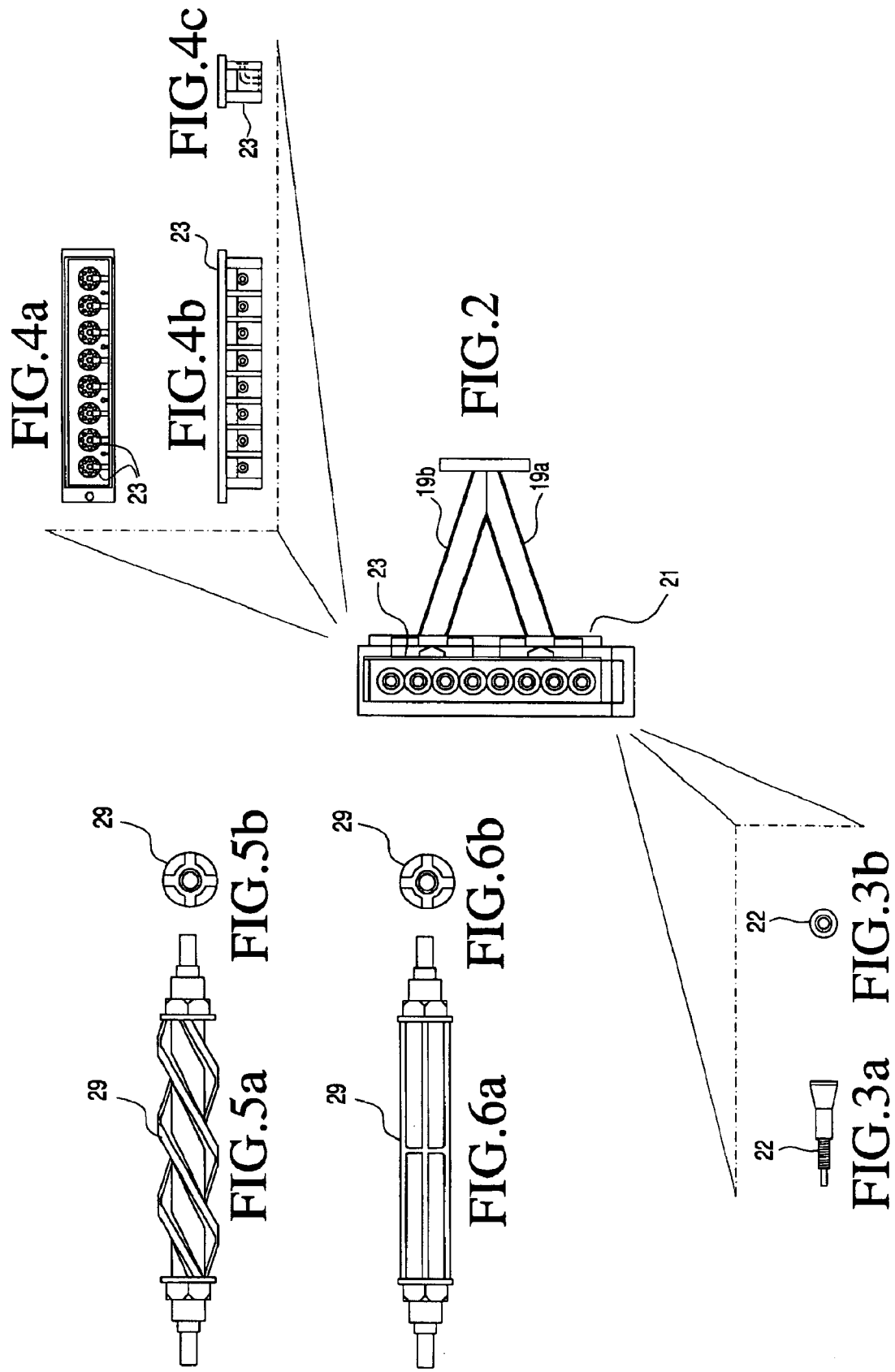

METHOD AND APPARATUS FOR PRODUCING CO-EXTRUDING PASTA

BACKGROUND OF INVENTION

This invention relates to a machine for producing co-extruded filled pasta. In particular, it relates to an improved method of distributing the mixed pasta dough from an extruder to a series of multiple co-extrusion die inserts that are aligned in a straight line. The straight-line alignment allows the extruded strands to drop unassisted directly into a single style crimp/cut die. The die can have the typical straight cut or angular cut (for the penne design) or even a semicircular cut (for the sea shell design).

The prior art discloses mounting a round die to a pasta dough extruder. The round die has co-extrusion die inserts arranged in a polar design equally spaced around the diameter. There are no means for controlling the flow of dough to the co-extrusion die inserts.

Due to the polar positioning of the co-extrusion die inserts, mounting-filling lines is extremely difficult and usually results in different and long hose lengths. This results in inaccuracy from the pump and difficultly in cleaning of the hoses/tubes. Finally, another disadvantage of the prior art is that the filled pasta strands have to be oriented manually and by means of guides and guide rollers to position them at a specific center distance before entering the crimp/cutter die. This is due to the polar locations of the co-extrusion die inserts.

Prior art U.S. Pat. No. 5,296,247 to Huang, et al, discloses a method and apparatus for making pre-cooked filled pasta products by co-extrusion. The apparatus utilizes a steam injected preconditioner, a co-rotating intermesh twin screw extruder with a low shear configuration and a co-extrusion die, and a stamper for forming a continuous co-extruded filled shell into pasta segments of predetermined configuration.

U.S. Pat. No. 5,660,102 to Askman, et al, discloses an apparatus for forming a pasta strip about a filling material including a ring member, which forms the curved strip into a tube as the strip is moved longitudinally.

Other patents of interest in the use of co-extrusion equipment to prepare filled food products include U.S. Pat. No. 4,574,590 to Chiao, et al; U.S. Pat. No. 4,579,744 to Thulin, et al; and, U.S. Pat. No. 4,618,499 to Wainright.

The prior art patents fail to disclose a method and apparatus for making filled pasta including multiple co-extrusion die inserts that are arranged in a straight line which allow co-extruded strands to drop directly in a single crimp/cut die automatically.

SUMMARY OF INVENTION

This invention relates to a method and apparatus for producing co-extruded pasta such as stuffed rigatoni. The invention discloses an improved dough extrusion design and the use of a single die with the ability to make an angular end crimp/cut, typical straight end crimp/cut and seashell shape with crimp/cut.

According to the improved method for producing co-extruded filled pasta, the mixed pasta dough from an extruder is distributed to a series of multiple co-extrusion die inserts that are aligned in a straight line. The straight-line alignment allows the extruded strands of dough to drop unassisted directly into a single style crimp/cut die. As noted, the die can have the typical straight cut or angular cut for the penne design or even a semicircular cut for the seashell design.

Accordingly, an object of this invention is to provide a new and improved method and apparatus for the production of co-extruded pasta.

Another object of this invention is to provide a new and improved extrusion method and apparatus for producing stuffed rigatoni, stuffed penne and stuffed shells including a series of multiple co-extrusion die inserts aligned in a straight line which receive dough from an extruder.

A further object of this invention is the novel use of a single die to make an angular end crimp/cut, a typical straight end crimp/cut, or a semicircular seashell cut.

A more specific object of this invention is to provide a new and improved method and apparatus for producing co-extruded pasta which comprises feeding a plurality of dough strips to a series of co-extrusion die inserts arranged is a straight line and regulated by adjustable metering valves to provide a hollows pasta strand stuffed with predetermined food material which drops unassisted into a single crimp/cut die automatically without any assistance.

BRIEF DESCRIPTION OF DRAWINGS

The above and other objects of the invention may be more readily seen when viewing in conjunction with the accompanying drawings wherein.

FIG. 2 is a side view of the Y-manifold and co-extrusion dies.

FIG. 3a is a side view of an adjustable metering valve and FIG. 3b is an end view of a typical valve.

FIG. 4a is a side exit view of the co-extrusion die inserts, FIG. 4b is a side exit view the die inserts and FIG. 4c is an end view of the die inserts.

FIGS. 5a and 5b are, respectively, a side and end view of a crimping die for producing a particular product; and.

FIGS. 6a and 6b are side and end views of an alternate embodiment type of crimping die.

DETAILED DESCRIPTION

Figure 1:
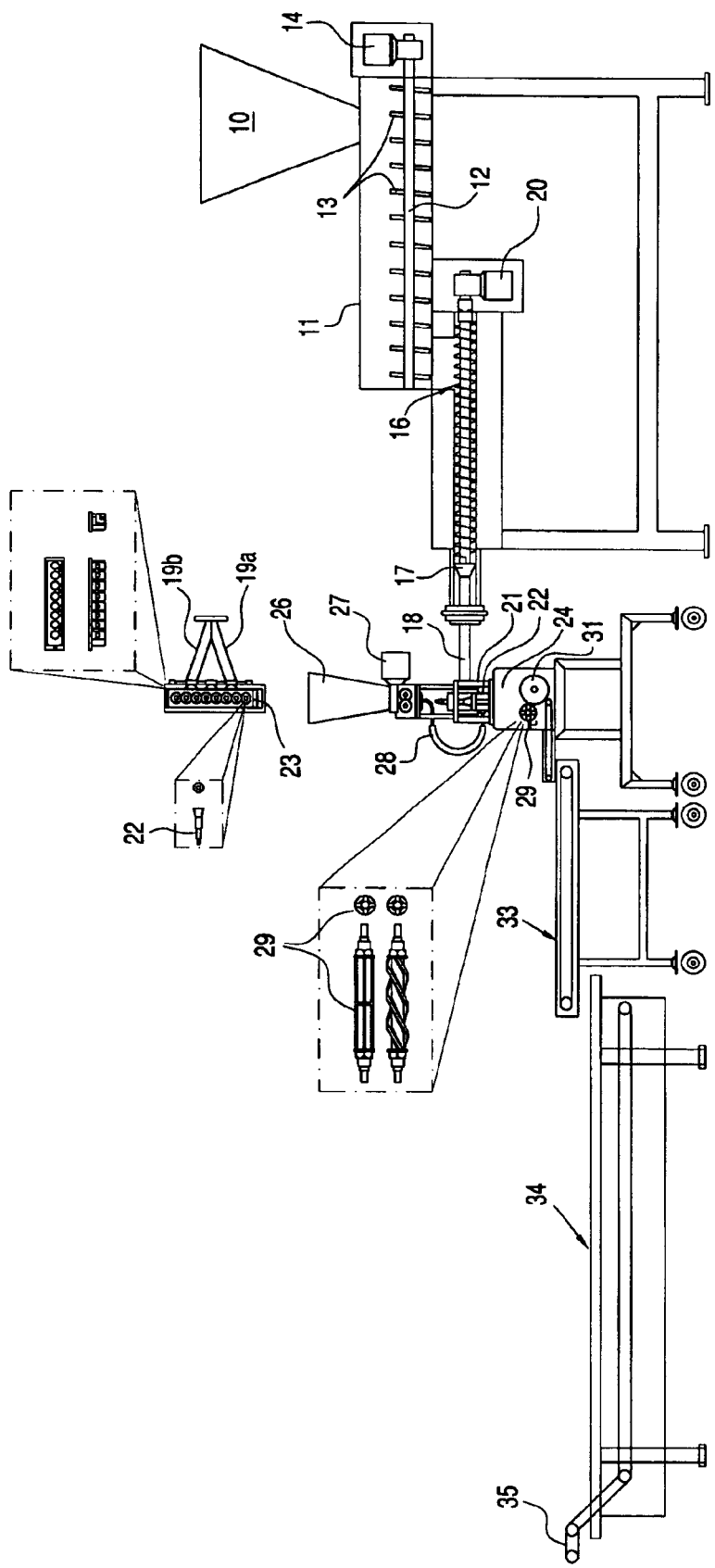
FIG. 1 is a front view of the apparatus comprising the invention.

This invention is an improvement in the product/manufacturing of the co-extruded pasta known as "stuffed rigatoni", "stuffed penne", "stuffed shells". These products are the filled fresh frozen version of the typical dry pasta shapes. Dry pasta rigatoni typically has a cylindrical shape with a wall of pasta of a certain thickness around the diameter with straight/square ends and having ridges all around the diameter running in the extruded direction and or length. The "ridges" translate to "rigata" or the combined word "rigata"+"macaroni"="rigatoni".

Dry pasta "penne" typically have a cylindrical shape with a wall of pasta of a certain thickness around the diameter with angular ends and sometimes have ridges all around the diameter running in the extruded direction or length. The angular cut creates the look of an old fashioned "ink pen", translating to "penne".

Dry pasta "shells" typically have the shape of a "sea shell", open on one side, with a wall of pasta of a certain thickness and sometimes have ridges around the outside radius running in the extruded direction.

The apparatus for producing co-extruded pasta is basically shown in FIG. 1. In the invention, predetermined amounts of eggs, flour and water are deposited in the hopper 10 to form pasta. The ingredients are delivered at a controlled rate to the mixing chamber 11 where the rotating member 12 with projecting fins 13 mixes the ingredients into a granular state. The member 12 is coupled to the drive motor 14 to simultaneously move the mixture forward and feed it to the auger screw 16 driven by motor 20 that compresses the granular mix of flour, eggs and water into a solid mass. This solid mass comprises a continuous cylindrical rope of dough 17.

The dough 17 is forced into a "Y" manifold 18, see FIG. 2, where the rope 17 is divided in half with fifty-percent traveling to the left and fifty-percent traveling to the right creating two continuous tubes of rope dough 17. At the end of each tube branch 19a, 19b, the rope dough 17 is subdivided once again creating four streams of dough that lead to a common closed chamber 21. Each stream of dough 17 feeds in front of two adjustable metering valves 22 that are positioned directly over two co-extrusion die inserts 23, see FIG. 3. The metering valves 22 are designed to restrict the flow of dough 17 into the co-extrusion die inserts 23. These eight valves 22 are to be regulated at the start-up of production. Regulating the valve 22 by rotating it clockwise or counterclockwise will allow for balancing the flow of the co-extruded strands 24 to be equal.

Filling is fed into the hollow pasta strands 24 from hopper 26 with an eight-column positive displacement gear pump 27. This pump 27, although having one common main body, allows for eight fully independent positive displacement pumps. Each pump services a co-extrusion die insert 23 via a "short" flexible hose or tube 28, all eight being equal in length. The pump 27 is variable speed in order to control the weight/volume of flow through the hoses/tubes 28. The multiple filled strands 24, at a specific center distance to each other, automatically drop vertically between the crimp/cutter die 29 and the backing roller 31. As the strands 24 pass through vertically, the ends of the cylindrical shaped strands are crimp-sealed and cut to length continuously. The die diameter determines the fixed final length.

The die configuration can be as simple as a straight cut or an angular cut or even a semicircular cut. The straight cut would be used for "stuffed rigatoni", the angular cut would be used for "stuffed penne", and the semicircular cut would be used for the "stuffed shells". The final product is delivered on conveyer 35.

When the filed strands pass through the crimp/cutter die 29, a thin membrane of a dough 0.006 is left between each piece allowing the filled pasta pieces to create a "chain" that comes onto a conveyor 32 having the same speed 1:1 as the crimp/cutter die 29 and backing roller 31 and are then placed onto another faster conveyor 33 that will transport the filled pasta pieces to either a hot water cooker 34 to pre-cook the final product or to a freezer to leave in its raw state.

While the invention has been explained by a detailed description of certain specific embodiments, it is understood that various modifications and substitutions can be made in any of them within the scope of the appended claims, which are intended also to include equivalents of such embodiments.

What is claimed is:

1. An apparatus for producing co-extruded pasta from pasta ingredients and filler comprises:
    a pasta dough extruder for producing a pasta strand;
    means for converting the pasta strand into a plurality of strands;
    a plurality of co-extrusion die inserts positioned in a straight line for forming and filling the pasta strands; and,
    a single crimp/cut die for crimping and cutting the filled pasta strands to form a predetermined pasta configuration.

2. An apparatus for producing co-extruded pasta in accordance with claim 1 further including:
    a feed hopper having an input for receiving pasta ingredients and an output;
    a mixer located at the hopper output for combining the ingredients into a mixture; and, wherein the extruder comprises
    an auger screw coupled to the mixer for forming the mixture into a cylindrical strand of pasta dough.

3. An apparatus for producing co-extruded pasta in accordance with claim 2 wherein the means for converting the pasta strand into a plurality of strands comprises:
    a first Y-manifold for dividing the dough strand from the extruder into two continuous strands of dough; and,
    means for subdividing the two strands of dough into four continuous strands of dough.

4. An apparatus for producing co-extruded pasta in accordance with claim 1 further including:
    a plurality of adjustable metering valves to adjust the flow of dough to the co-extrusion die inserts;
    means for filling the co-extruded strands; and,
    a conveyor receiving the formed and cut pasta from the single die.

5. An apparatus for producing co-extruded pasta in accordance with claim 4 further including:
    a hot water cooker receiving the formed and filled pasta from the conveyor.

6. An apparatus for producing co-extruded pasta in accordance with claim 4 further including:
    a filling means having an input to receive filling and an output;
    an multi-column positive displacement pump coupled to the output of the filling means;
    a plurality of independent displacement pumps each corresponding to a column of the position displacement pump servicing a co-extrusion die insert, and including a plurality of flexible hoses of equal length each joining a pump to a corresponding die insert.

7. An apparatus for producing co-extruded pasta in accordance with claim 6 further including:
    the pump includes variable speed control to control the weight/volume of filling through the hoses.

8. An apparatus for producing co-extruded pasta in accordance with claim 4 further including:
    a backing roller positioned adjacent the crimp/cut die between which the filled pasta dough strands drop vertically and are crimp-sealed and cut to length.

9. A method for producing co-extruded pasta from pasta ingredients and a filler comprising:
    feeding the pasta ingredients to a mixer;
    mixing the ingredients and moving the mixture to an extruder;
    extruding the mixture to form a cylindrical strand of pasta dough;
    dividing the dough into a plurality of strands;
    feeding and individually metering the plurality of strands and the filler to a plurality of co-extrusion die inserts arranged in a straight line; and,
    crimping and cutting the co-extruded filled pasta strands to form a predetermined stuffed pasta configuration.

10. A method for producing co-extruded pasta in accordance with claim 9, further including the steps of:
   providing a crimping/cutting die;
   dropping the plurality of strands from the co-extrusion die inserts vertically downward through crimping/cutting die to crimp/cut the pasta strands;
   catching and conveying the crimped/cut pasta strands; and,
   passing the pasta strands through a hot water cooker.

11. A method for producing co-extruded pasta in accordance with claim 10 wherein:
   changing the crimping/cutting die to attain a different stuffed pasta configuration.

12. A method for producing co-extruded pasta in accordance with claim 9 wherein:
   the pasta is rigatoni.

* * * * *